March 10, 1931. A. O. ABBOTT, JR 1,796,178
APPARATUS FOR MANUFACTURING TIRE CASINGS
Filed Sept. 24, 1928
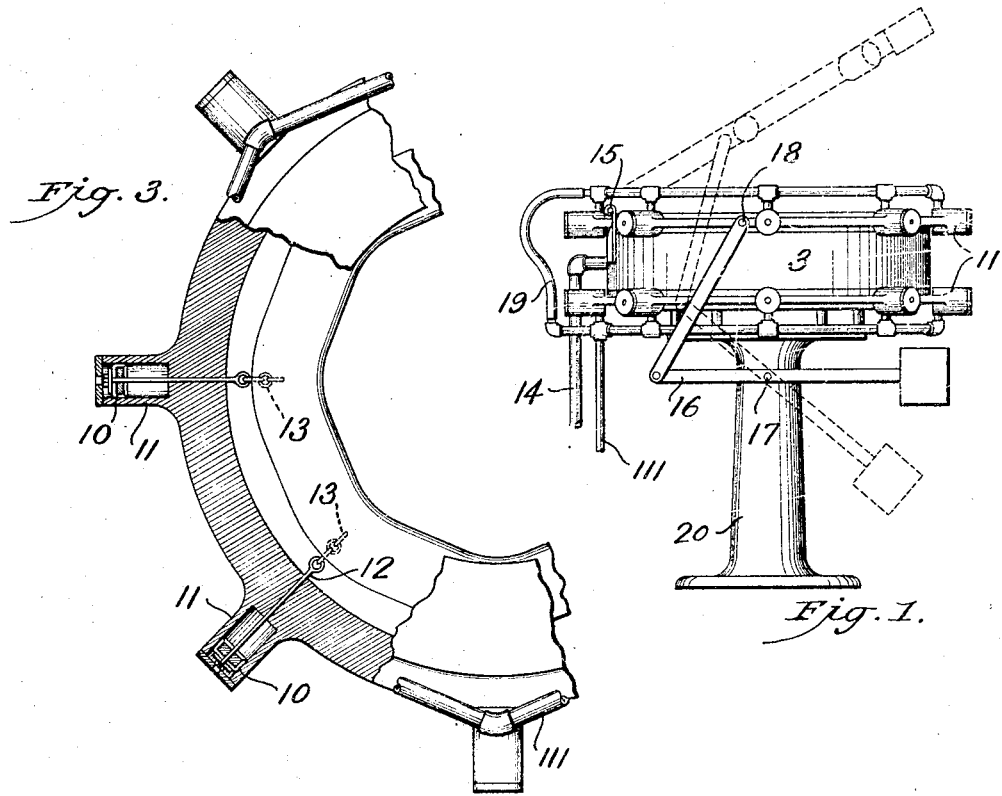
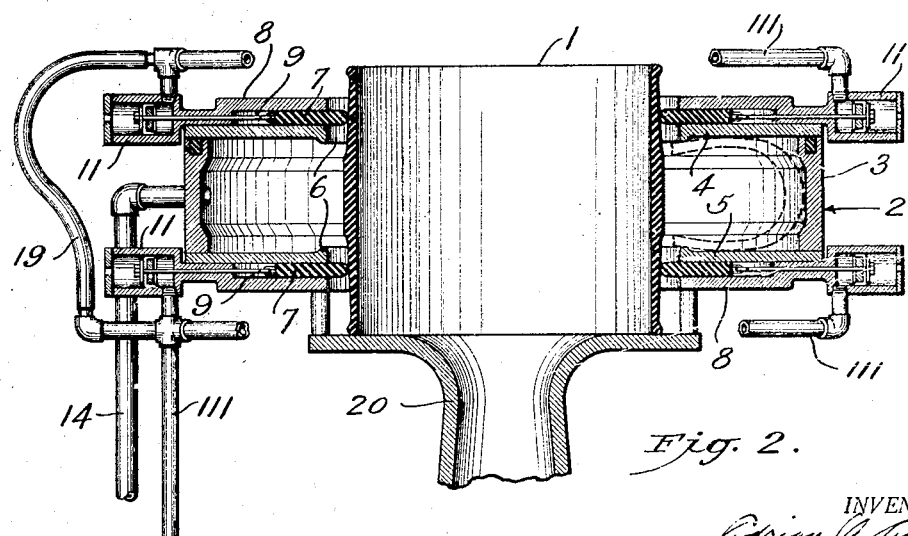

Patented Mar. 10, 1931

1,796,178

UNITED STATES PATENT OFFICE

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN

APPARATUS FOR MANUFACTURING TIRE CASINGS

Application filed September 24, 1928. Serial No. 308,090.

This invention relates to a machine for expanding automobile tires from the flat pulley band form to the normal tire shape and is an improvement over the device disclosed in my Patent No. 1,507,563, granted Sept. 9, 1924.

It is the object of this invention to provide a new and efficient means for forming a seal between the pulley band and the apparatus for expanding the pulley band.

Without intending to limit my invention more than is required by the prior art, and with the specific embodiment disclosed in mind, it consists in providing elastic rings at the sides of a casing, which elastic rings may be expanded to admit a pulley band and then allowed to contract so as to contact with the pulley band to form a seal therewith.

For a clear understanding of my invention reference should be made to the following detailed description and the accompanying drawings in which:

Fig. 1 is an elevation of my machine;

Fig. 2 is a central vertical section of my machine showing the pulley band in position;

Fig. 3 is a detailed view partly in section showing the means for expanding an elastic ring.

The pulley band 1 is inserted within the casing 2 which consists of the annular side wall 3, and top and bottom end walls 4 and 5, said casing being of an annular form having a central aperture therethrough as indicated at 6, which freely admits the pulley band 1, there being considerable play between the walls of the aperture 6 and the pulley band, as shown clearly in Fig. 2. In order to provide a seal between the casing and the pulley band the elastic rings 7 are provided.

The elastic rings 7 are positioned on the outside of the top and bottom end walls 4 and 5, as shown in Fig. 2, and are held in position by the circular plates 8 suitably secured to the end walls. The plates 8 cooperate with the walls 4 and 5 to provide the circular slots 9 in which the elastic rings 7 move. The elastic rings may be of vulcanized rubber or any other suitable elastic material.

In order to provide means for expanding the elastic rings 7 so as to admit the pulley band 1 within the casing 3, a series of pistons 10 are disposed about the periphery of the casing, the pistons being slidable in the cylinders 11 which are integral with the circular plates 8. The pistons are connected with the elastic ring by the rods 12 and chain links 13 which are embedded within the material of the ring. Air under pressure is fed to the cylinders 11 through the pipe connections 111 which lead from a suitable source of pressure.

The casing 3 is supported upon the pedestal 20 which also serves as a table upon which the lower edge of the pulley band may rest when first positioned in the machine.

Suction is applied to the casing 3 through the pipe connection 14 from any suitable source.

In order to permit the formed tire to be removed from the casing, after it has been shaped, the upper plate 4 of the machine is hingedly mounted on the casing as at 15, see Fig. 1, and a weighted lever system 16, pivoted to the pedestal as at 17 and to the plate 4 as at 18, is provided for opening the casing after the completion of a cycle of operations. A flexible tube 19 is interposed in the pipe system 12 so as to permit the opening of the top plate 4.

In the operation of the machine pressure is introduced into the cylinders 11 through the pipe system 111 thereby expanding the elastic rings 7 so that a pulley band 1 may be introduced into the machine. The pulley band is positioned on the upper surface of the pedestal 20 and the pressure acting in cylinders 11 is released thereby allowing the elastic ring 7 to contract so as to contact with the pulley band and form a seal therewith. Suction is then applied through pipe 14 to the casing 3 which draws the pulley band to tire shape as indicated in dotted lines, in Fig. 2. As the pulley band changes shape the ring 7 serves to maintain the seal between the pulley band and the casing in the initial stages of the operation while the edges of the aperture 6 contact with the pulley band to form a seal during the final stages of the shaping operation. The curing bag is introduced into the tire in the usual manner, the upper plate 4 lifted by the lever system 16 and the formed tire casing with the curing bag therewithin is removed from the machine.

While one specific embodiment of my invention has been described in detail, other forms of my invention such as would occur to one skilled in the art are contemplated, and for an understanding of the scope of my invention reference should be made to the following claims.

Having thus described my invention what I claim and desire to protect by Letters Patent is:

1. In a pulley band expanding machine in combination, a rigid annular casing open along its inner periphery and adapted to receive a pulley band within its inner periphery, expansible means for creating a seal with the pulley band, and piston means for expanding said expansible means to facilitate the insertion of the pulley band within said casing.

2. In a pulley band expanding machine in combination, an annular casing open along its inner periphery and adapted to receive a pulley band therewithin, an elastic ring at each end of the casing adapted to contact with the pulley band to form a seal, and separate circumferentially spaced means for stretching the ring so as to permit the insertion of the pulley band therewithin.

3. In a pulley band expanding machine in combination, an annular casing open along its inner periphery and adapted to receive a pulley band therewithin, an elastic ring at each end of the casing adapted to contact with a pulley band to form a seal, and a series of pistons connected with said ring at spaced intervals, said pistons being operable to expand the ring so as to permit the insertion of the pulley band.

4. In a pulley band expanding machine in combination, a non-collapsible annular casing open along its inner periphery and adapted to receive a pulley band, an expansible ring at each end of the casing, piston operated means actuable to expand the ring to admit the pulley band and to release the ring to permit it to form a seal with the pulley band, and means for creating suction within said casing.

5. In a pulley band expanding machine in combination, an annular casing opening along its inner periphery and adapted to receive a pulley band therewithin, an elastic ring at each end of the casing adapted to contact with the pulley band to form a seal, and means for connection to said ring at different places around its periphery for stretching the ring so as to permit the insertion of the pulley band therewithin.

Signed at Detroit, county of Wayne, State of Michigan, this 18th day of September, 1928.

ADRIAN O. ABBOTT, Jr.